US005941808A

United States Patent [19]

Oder

[11] Patent Number: 5,941,808

[45] Date of Patent: Aug. 24, 1999

[54] CASING FOR PRINTING ROLLERS

[75] Inventor: Günter Oder, Lengerich, Germany

[73] Assignee: Windmöller & Hölscher, Lengerich/Westf., Germany

[21] Appl. No.: 08/828,619

[22] Filed: Mar. 31, 1997

[30] Foreign Application Priority Data

Apr. 2, 1996 [DE] Germany ........................... 196 13 145

[51] Int. Cl.[6] ........................ B23P 15/00

[52] U.S. Cl. ........................ 492/48; 492/53

[58] Field of Search ........................ 492/48, 53, 54, 492/56

[56] References Cited

U.S. PATENT DOCUMENTS

| | | | |
|---|---|---|---|
| 3,640,218 | 2/1972 | Allison . | |
| 4,144,812 | 3/1979 | Julian | 492/48 |
| 4,339,858 | 7/1982 | Peterson | 492/48 |
| 5,253,027 | 10/1993 | Goto | 492/56 |
| 5,257,965 | 11/1993 | Fuchs et al. | 492/56 |
| 5,316,798 | 5/1994 | Tittgemeyer | 492/48 |
| 5,342,277 | 8/1994 | Steiner et al. | 492/56 |
| 5,466,212 | 11/1995 | Springer | 492/48 |
| 5,742,880 | 4/1998 | Takenaka et al. | 492/54 |

FOREIGN PATENT DOCUMENTS

| | | |
|---|---|---|
| 502 022 | 7/1930 | Germany . |
| 1 097 452 | 1/1961 | Germany . |
| 4119824C1 | 12/1992 | Germany . |
| 3908999C2 | 3/1993 | Germany . |
| 19545597 | 6/1997 | Germany . |
| 122985 | 2/1919 | United Kingdom . |

*Primary Examiner*—I. Cuda
*Attorney, Agent, or Firm*—Evenson, McKeown, Edwards & Lenahan, PLLC

[57] ABSTRACT

A casing for printing presses includes a mantle tube of aluminum and provided with inner, collar-like bands. The casing is shrunk over a two-layer inner tube. The use of hard foam used, in known casings, to connect the outer mantle tube to the inner, two-layer tube can be eliminated in this way. This is advantageous since practical operations have shown that hard foam is susceptible to chemical, thermal and mechanical stresses.

20 Claims, 1 Drawing Sheet

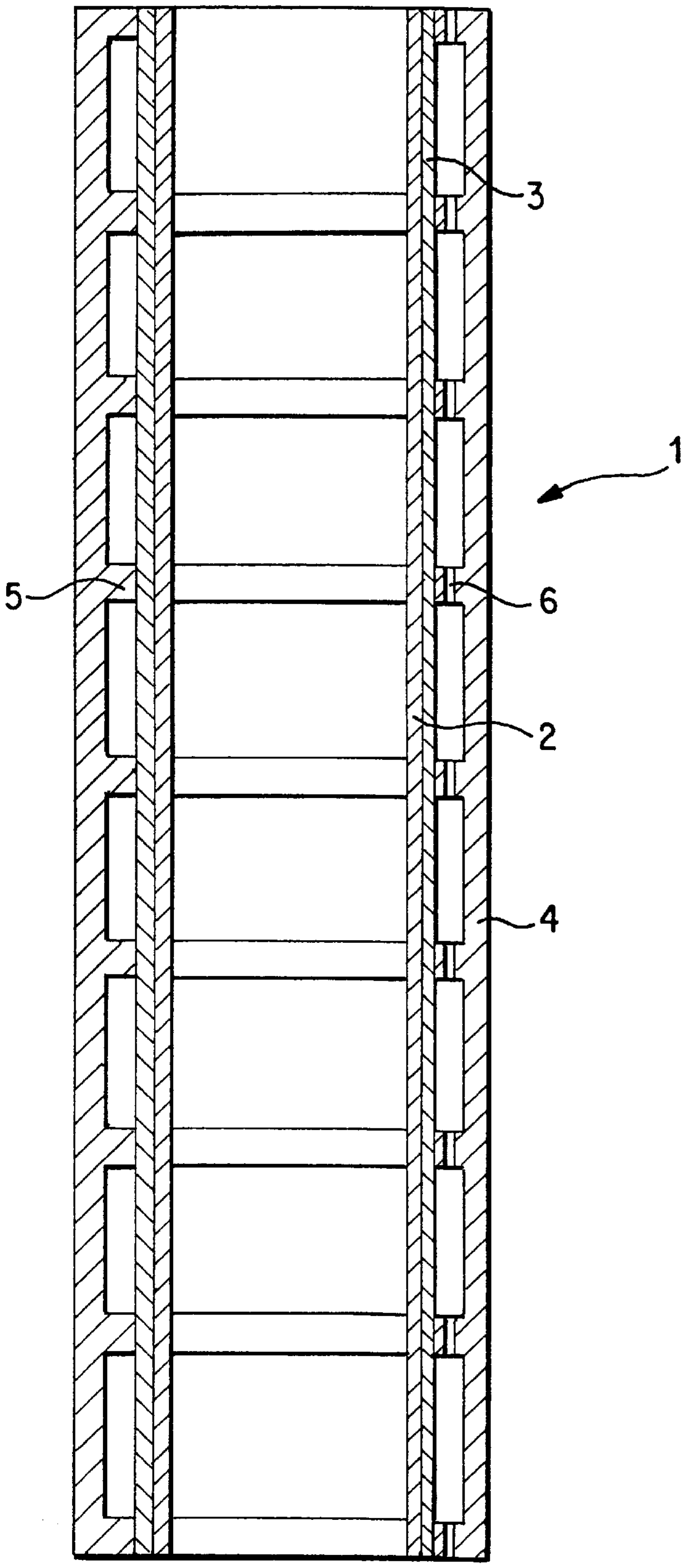
3
1
5
6
2
4

CASING FOR PRINTING ROLLERS

BACKGROUND OF THE INVENTION

1. Field of the Invention

This invention pertains to casings for rollers such as gravure rollers of rotary printing presses including inner and outer tubes. Each inner tube is made of expandable synthetic material such as, for example, DUROMER. An outer layer of an elastomer such as, for example, polyurethane is applied on each inner tube. A form-stable mantle tube is securely connected onto the outer layer by supporting material.

2. Description of Related Art

In known casings, the supporting material consists of a hard foam through which a tight connection of the outer mantle tube to the two-layer inner tube is established. In practice, the hard foam used as supporting material is susceptible to thermal, chemical and mechanical stress. On the other hand, the use of hard foam makes possible the production of lightweight casings. The current invention therefore addresses the problem of designing a casing of the type described above so that it is light and so that a permanent and strong connection is formed between the mantle tube and the two-layer inner tube.

SUMMARY OF THE INVENTION

According to the present invention, the supporting material is formed of at least one circular band. This band can be arranged in a helix across the entire axial length of the casing. Several annular bands can also be provided which are spaced apart. The mantle tube and the bands are produced as a single piece of aluminum using a centrifugal casting process. The advantage of the centrifugal casting process is that the mantle tube is produced with the bands without any stress at all. In one suitable embodiment, each band has at least one perforation running in the axial direction of the casing. In this manner, it is ensured that the heat produced during the subsequent coating of the casing with an engravable material can be easily dissipated. Another essential property for the production of the casing is that a mantle tube provided with inner bands is shrunk onto the inner, expandable tube provided with an elastomer layer. Due to the shrinkage process, a dependable connection is assured between the mantle tube and the two-layer inner tube.

BRIEF DESCRIPTION OF THE DRAWING

The single drawing figure illustrates one example of a casing according to this invention.

DESCRIPTION OF THE PREFERRED EMBODIMENT

In the drawing figure, reference numeral 1 refers to a casing for printing rollers which includes an inner expandable tube 2 made of fiberglass-reinforced plastic. An external, compressible layer 3 is applied to this fiberglass reinforced plastic tube. The external layer 3 is made of an elastomer such as, for example, polyurethane. The two-layer inner tube is surrounded at a distance by a form-stable mantle tube 4, which is securely connected via bands or flanges 5 to the two-layer inner tube. As is indicated in the figure, the form-stable mantle tube 4 and the bands 5 are of single-piece design. Formation of the single piece design takes place preferably by centrifugal casting. As is generally known, when using a casing as a gravure roller, the outer mantle tube is coated with an engravable layer of, for example, ceramic. A large amount of heat is produced during this process. In order to be able to dissipate this heat easily, the bands 5 are provided with bored perforations 6 running in an axial direction of the casing 1. The application of the mantle 4 with the bands 5 onto the two-layer inner tube including the tube 2 and the layer 3 takes place by using a shrinkage process so that a dependable attachment is assured. The advantage of a casing designed in this manner is essentially that it is low in weight and exceptionally resistant to thermal, chemical and mechanical stresses.

I claim:

1. A sleeve for screen rollers of rotary printing machines, comprising:

an inner tube made of a ductile plastic material, an external layer of an elastomer applied to said inner tube, and a dimensionally stable jacket tube consisting of metal fixedly connected to said external layer by a base forming part of said jacket tube, wherein the base has at least one interior web and consists of metal.

2. The sleeve according to claim 1, wherein the base and the dimensionally stable jacket tube are constructed in one piece.

3. The sleeve according to claim 1, wherein the base and the dimensionally stable jacket tube consist of aluminum.

4. The sleeve according to claim 1, wherein the base consists of several circular webs arranged at a distance from one another.

5. The sleeve according to claim 1, wherein the base is constructed as a helically extending web.

6. The sleeve according to claim 1, wherein the base has at least one heat-dissipating opening extending in an axial direction of the sleeve.

7. A process for producing a sleeve for screen rollers of rotary printing machines, comprising the steps of:

applying an external layer of an elastomer to an inner tube made of a ductile plastic material, providing a base forming part of a dimensionally stable jacket tube, the base having at least one interior web and consisting of metal, and shrinking said jacket tube provided with said at least one interior web onto the layer of the elastomer applied to said inner tube to fixedly connect the jacket tube to said external layer.

8. The sleeve according to claim 2, wherein the base and the dimensionally stable jacket tube consist of aluminum.

9. The sleeve according to claim 2, wherein the base consists of several circular webs arranged at a distance from one another.

10. The sleeve according to claim 3, wherein the base consists of several circular webs arranged at a distance from one another.

11. The sleeve according to claim 2, wherein the base is constructed as a helically extending web.

12. The sleeve according to claim 3, wherein the base is constructed as a helically extending web.

13. The sleeve according to claim 2, wherein the base has at least one heat-dissipating opening extending in an axial direction of the sleeve.

14. The sleeve according to claim 3, wherein the base has at least one heat-dissipating opening extending in an axial direction of the sleeve.

15. The sleeve according to claim 4, wherein the base has at least one heat-dissipating opening extending in an axial direction of the sleeve.

16. The sleeve according to claim 5, wherein the base has at least one heat-dissipating opening extending in an axial direction of the sleeve.

17. A process for producing a sleeve for screen rollers of rotary printing machines, comprising the steps of:

applying an external layer of an elastomer to an inner tube made of a ductile plastic material, providing a base forming part of a dimensionally stable jacket tube, the base having at least one interior web, consisting of metal, and being constructed in one piece with the dimensionally stable jacket tube, and shrinking said jacket tube provided with said at least one interior web onto the layer of the elastomer applied to said inner tube to fixedly connect the jacket tube to said external layer.

18. A process for producing a sleeve for screen rollers of rotary printing machines, comprising the steps of:

applying an external layer of an elastomer to an inner tube made of a ductile plastic material, providing a base forming part of a dimensionally stable jacket tube, the base having at least one interior web and consisting of aluminum, and shrinking said jacket tube provided with said at least one interior web onto the layer of the elastomer applied to said inner tube to fixedly connect the jacket tube to said external layer.

19. A process for producing a sleeve for screen rollers of rotary printing machines, comprising the steps of:

applying an external layer of an elastomer to an inner tube made of a ductile plastic material, providing a base forming part of a dimensionally stable jacket tube, the base consisting of several circular interior webs arranged at a distance from one another and consisting of metal, and shrinking said jacket tube provided with said circular webs onto the layer of the elastomer applied to said inner tube to fixedly connect the jacket tube to said external layer.

20. A process for producing a sleeve for screen rollers of rotary printing machines, comprising the steps of:

applying an external layer of an elastomer to an inner tube made of a ductile plastic material, providing a base forming part of a dimensionally stable jacket tube, the base having at least one helically extending interior web and consisting of metal, and shrinking said jacket tube provided with said at least one helically extending interior web onto the layer of the elastomer applied to said inner tube to fixedly connect the jacket tube to said external layer.

* * * * *